July 2, 1935.  Z. D. GRANVILLE  2,006,391
AIRPLANE CONTROLS
Filed May 18, 1933  2 Sheets-Sheet 1
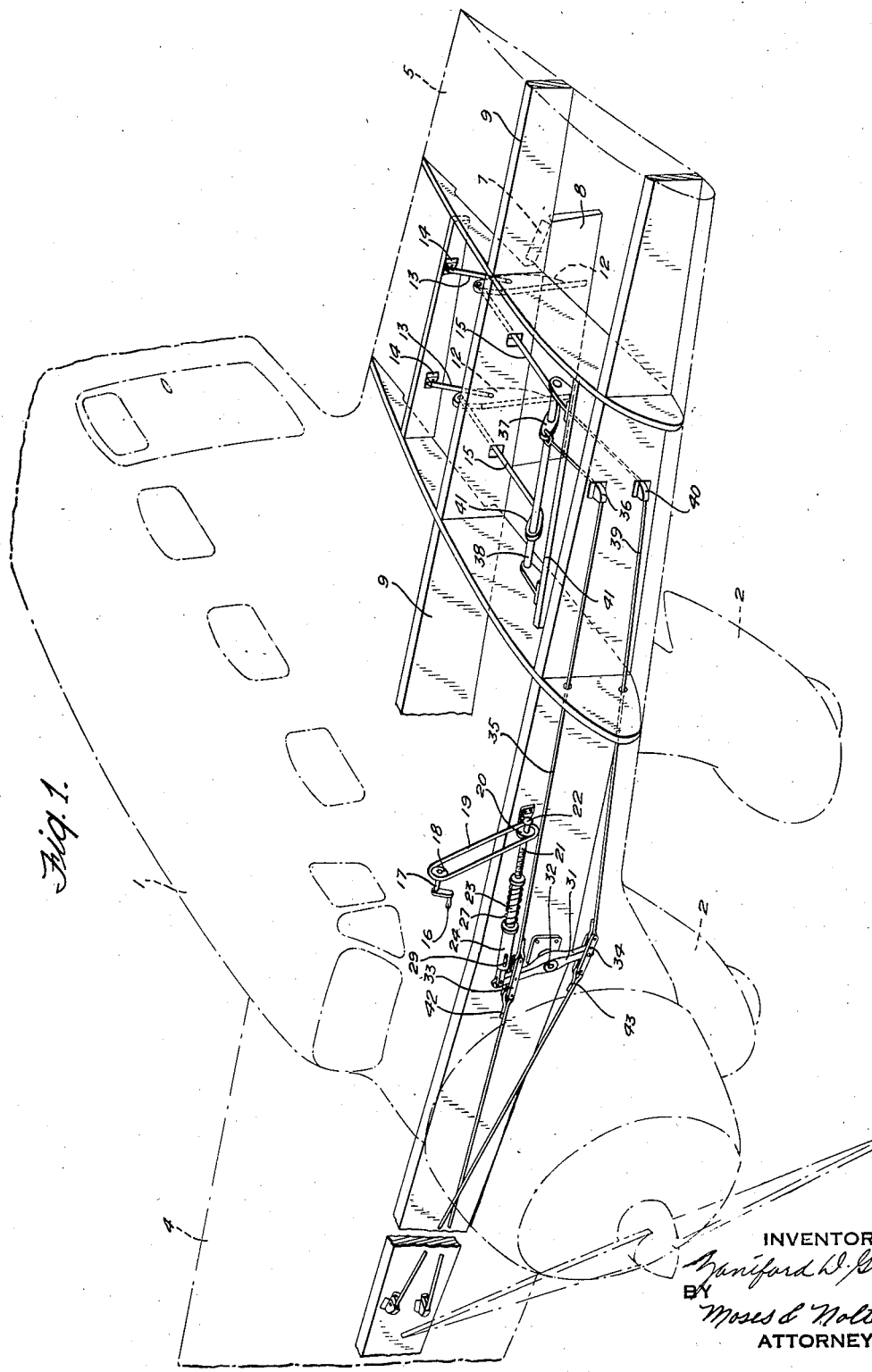
INVENTOR
BY
ATTORNEYS

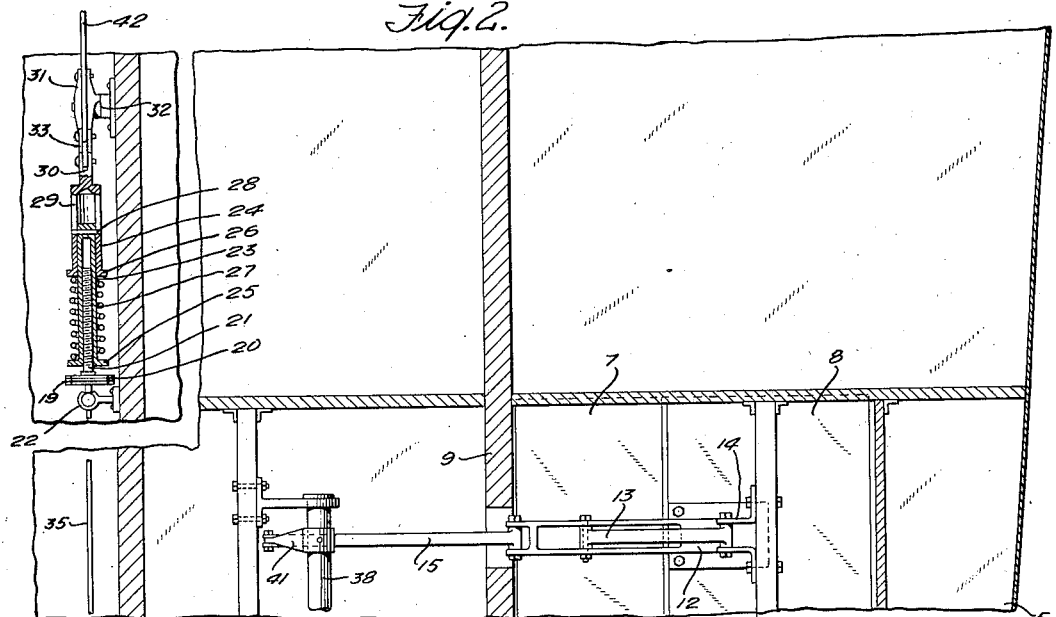
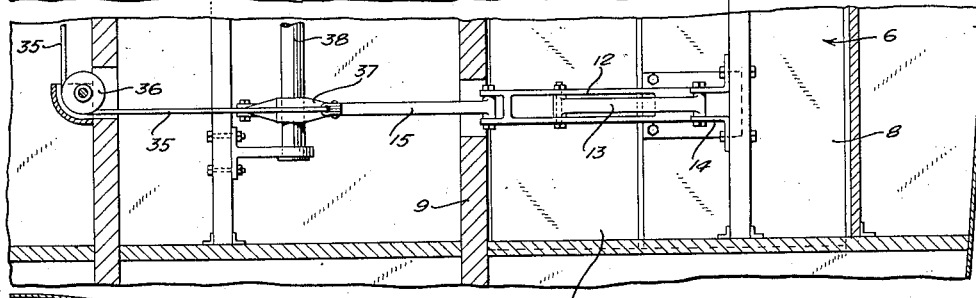
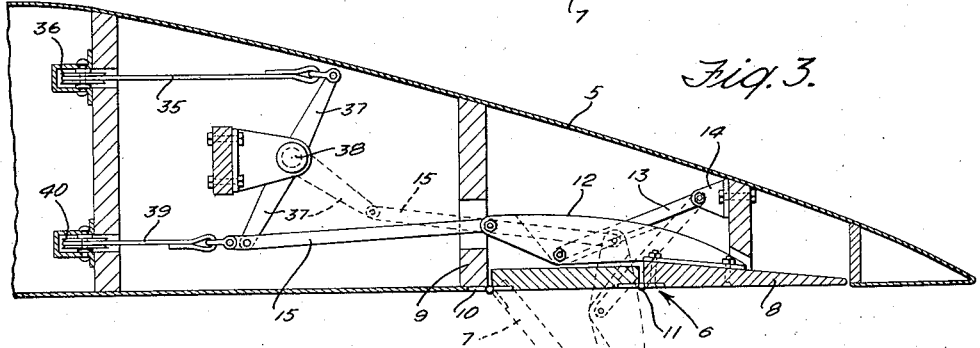

Patented July 2, 1935

2,006,391

UNITED STATES PATENT OFFICE 2,006,391

AIRPLANE CONTROLS

Zantford D. Granville, West Springfield, Mass.

Application May 18, 1933, Serial No. 671,603

6 Claims. (Cl. 244—12)

This invention relates to airplane controls and has for an object to provide practical and efficient flap mechanism adapted to be set by the pilot to retard the forward motion of the machine and to increase the lift thereof. This invention resides more particularly in improvements in the flap construction and in the flap operating means.

In accordance with one feature of the invention, provision is made of a flap comprising a main leaf hinged to a wing, a secondary leaf hinged to the main leaf and flap operating means connected to the secondary leaf. A more particular feature of the leaf construction referred to lies in the combination therewith of operating mechanism adapted to be housed normally wholly within the wing, and to move the flap structure between a normal position, in which it is included within the wing boundaries, and a projected position, in which it is depressed, without subjecting any of the operating parts to excessive strain.

It is a further feature of the invention that the operating train includes spring means adapted to yield when excessive forces are encountered. The spring operating mechanism allows the projected flaps to close automatically to or toward normal position under excessive load such as would be encountered if the airplane were put into a steep dive with the flaps down, or if the pilot opened the throttle to take the air again after attempting to land. In either case, the increased speed would cause higher pressures on the flaps which would at least partially overcome the pressure of the spring in the control, allowing the flaps to close automatically without any attention on the pilot's part. The flaps would, however, be automatically restored to the original projected positions upon the restoration of normal pressure.

Other objects and advantages will hereinafter appear.

In the drawings forming a part of this specification.

Figure 1 is a fragmentary perspective view illustrating a portion of a monoplane embodying the present invention;

Figure 2 is a fragmentary sectional plan view illustrating the flap operating mechanism of Figure 1; and Figure 3 is a fragmentary transverse sectional elevation illustrating the mechanism of Figures 1 and 2.

The airplane I which is illustrated as of the monoplane type comprises a fuselage I, an undercarriage 2, and wings 4 and 5. Each of the wings 4 and 5 is provided adjacent the fuselage with a flap 6 comprising leaves 7 and 8. The flaps are symmetrically disposed with reference to the longitudinal, central, vertical plane of the machine. The flap associated with the wing 5 and the operating means therefor will be described. The corresponding parts associated with wing 4 are substantial duplicates so that one description will suffice for both.

The leaf 7 of flap 6 is secured to a longitudinal wing spar 9 by means of hinges 10. The leaf 8 is secured to the leaf 7 by means of hinges 11. Links 12, fixedly secured to the upper surface of leaf 8, normally lie within the wing and extend forward from the leaf 8. Links 13 pivotally supported from fixed brackets 14 form movable pivots for the links 12. A rod 15 which lies within the wing and which is pivoted to the forward end of the link 12, is movable fore and aft to swing the flap between normal and depressed positions. The operation of the flap mechanism through rod 15 is controlled by the pilot through mechanism which will now be described.

A crank handle 16 is disposed in the fuselage adjacent the pilot's seat for operating the flaps simultaneously and in unison. The crank handle is fast upon a horizontal shaft 17. The shaft also has fast upon it a sprocket 18. The sprocket 18 transmits rotary movement through a chain 19 to a sprocket 20 which is fast upon a screw 21. The screw 21 is universally mounted at one end by means of a ball and socket mounting 22, and is threaded into a sleeve 23. The sleeve 23 telescopes into a sleeve 24. The sleeves 23 and 24 are provided, respectively, with collars 25 and 26, and a coil spring 27 which encircles the sleeve 23 serves normally to force the collars 25 and 26 apart. A cross pin 28 carried by the sleeve 23 is adapted to travel in slots 29 formed in the sleeve 24. The cross pin 28 prevents rotation of the sleeve 23 and limits separation of the collars 25 and 26. The cross pin may, however, travel along the slot 29 whenever the force tending to maintain the flap in normal position, or to urge it toward normal position is great enough to overcome the expanding force of the spring 27.

The sleeve 24 is provided with an ear 30 whereby it is pivoted to one arm of a lever 31. The lever 31 is mounted upon a horizontal pivot pin 32 and is adapted to be rocked from side to side by operation of the crank 16 and the train of connecting mechanism described. The upper arm of the lever 31 has a link 33 pivoted upon it and the lower arm has a link 34 pivoted upon it. One end of the link 33 is connected through a cable 35, which runs upon a pulley 36, to the upper end of a lever 37 which is fast upon a torque tube 38. The lower link 34 is connected through a cable 39, which runs upon a pulley 40, to the lower end of the lever 37. The lower end of the lever 37 and the lower end of a parallel crank 41 are pivotally connected to the forward ends of the rods 15 and serve to operate the same.

It will be observed that when the crank handle 16 is operated in a direction to move the lever 31 counterclockwise (as viewed in Figure 1), the upper end of the lever 37 is drawn forward, and the lower end of said lever and the crank 41 are permitted to thrust rearward the rods 15 so that the rods 15 act to swing the flap to the dotted line position illustrated in Figure 3. Operation of the handle 16 in the opposite direction is effective to swing the lever clockwise (as viewed in Figure 1) and this pulls the lower ends of lever 37 and crank 41 forward, causing the rods 15 to pull forward on the links 12 and thus to return the flap to the normal full line position of Figure 3 in which the lower surface of the flap stands substantially flush with the lower surface of the wing.

In case excessive resistance to movement of the flap from normal position is encountered, or excessive force occurs tending to return the flap to or toward normal position when the flap has been operated away from such position, the operating train is adapted to yield through compression of the spring 27 so that no damage results. As soon as the excessive force is relieved, however, the flap will tend to return to the projected position from which it was moved.

The operating handle 16 is not responsive to any force which may be exerted upon the flap, but is adapted to retain any position to which it may be operated. This result is secured through the one way driving connection formed by the screw 21 and the sleeve 23. The spring means, however, is interposed between the sleeve 23 and the lever 31, and hence in that portion of the driving train common to the two flaps where, by its yielding it may permit the flaps to yield in unison, and by its recovery it may cause the two flaps to be restored in unison.

It has been stated that the flap mechanism of the wing 4 is a substantial duplicate of the flap mechanism of the wing 5. This is true so far as the operating parts are concerned. There is this difference, however, that the cable 42 connected to the left hand end of link 33 is connected like the cable 39 to operate the flap of wing 4 to normal position, while the cable 43 is connected like the cable 35 to operate the flap of wing 4 to open or projected position. This reversal may be secured in any desired manner as, for example, by crossing the cables 42 and 43.

The mechanism illustrated may be of extremely light construction, yet adapted to withstand all of the strains which will be imposed upon it in use. This result is secured not only from the provision of the yielding connection in the operating train, but also from the fact that the operating parts are so constructed and arranged that the lever arms through which forces are applied to all of the elements are of substantial length. It follows that the magnitude of the operating force applied need not be very great, and hence the translational forces applied at the various fulcra may be moderate. At the same time, the operating mechanism has been arranged to provide for carrying out the necessary movement within the confined space available within the wing structure.

While I have illustrated and described in detail the preferred embodiment of the invention, it is to be understood that changes may be made therein. I do not, therefore, desire to limit myself to the specific construction illustrated, but intend to cover my invention broadly in whatever form its principles may be utilized.

I claim:

1. In an airplane, in combination, a wing, a flap structure mounted on the wing and normally held within the bounds of the wing, said flap structure including a forward leaf hinged directly to the wing and a rear leaf hinged to the forward leaf, and means connected to the rear leaf for operating the flap structure between normal and depressed positions.

2. A structure as set forth in claim 1 wherein the operating means comprises a member rigid with the rear leaf, a swinging link providing a movable fulcrum for said member, a substantially horizontal operating rod within the wing connected to said member, and means for moving the rod longitudinally.

3. In an airplane, in combination, a pair of wings, flap structures mounted on the wings and normally held within the bounds of the wings, each of said flap structures comprising a forward leaf hinged directly to the wing and a rear leaf hinged to the forward leaf, an operating device connected to the rear leaf for operating the flap structures in unison between normal and depressed positions including a one-way driving means in that portion of the operating device common to the two flaps, and yieldable means also included in that portion of the operating device common to the two flaps for permitting the flaps to yield automatically.

4. In an airplane, in combination, a pair of wings, flap structures mounted on the wings and normally held within the bounds of the wings, each of said flap structures comprising a forward leaf hinged directly to the wing and a rear leaf hinged to the forward leaf, an operating device for projecting the flap structures in unison, and yieldable means included in that portion of the operating device common to the two flaps for permitting the flaps to yield automatically.

5. In an airplane, in combination, a wing, a flap member, means hinged to the wing and to the forward portion of said flap member and forming a swinging support for said member, an operating member rigid with the flap member and extending forward therefrom, a downwardly and forwardly inclined link support forming a swinging fulcrum for an intermediate part of said operating member, and means connected to said operating member at the forward end thereof for moving said member fore and aft.

6. In an airplane, in combination, a wing, a fuselage, a flap mounted on the wing, said flap comprising a forward leaf hinged directly to the wing and a rear leaf hinged to the forward leaf, an operating member mounted in the fuselage for operating the rear leaf of the flap, and an operating train running from said member to the flap, said train comprising a lever rockable transversely of the airplane by the operating member, cables connected to opposite arms of said lever and running through the wing, a torque tube mounted in the wing and rockable fore and aft, a pair of oppositely extending arms fast on the torque tube and connected respectively to the cables, and means disposed within the wing and connected to the flap and operable fore and aft from the torque tube.

ZANTFORD D. GRANVILLE.